United States Patent
Wu

(10) Patent No.: US 9,755,450 B2
(45) Date of Patent: Sep. 5, 2017

(54) CHARGING METHOD, CHARGING DEVICE, AND ELECTRONIC DEVICE FOR THE SAME

(71) Applicant: Ming-Hsiu Wu, Nantou (TW)

(72) Inventor: Ming-Hsiu Wu, Nantou (TW)

( * ) Notice: Subject to any disclaimer, the term of this patent is extended or adjusted under 35 U.S.C. 154(b) by 140 days.

(21) Appl. No.: 14/633,395

(22) Filed: Feb. 27, 2015

(65) Prior Publication Data

US 2015/0249357 A1  Sep. 3, 2015

(30) Foreign Application Priority Data

Mar. 3, 2014 (TW) .............................. 103107015 A

(51) Int. Cl.
*H02J 7/00* (2006.01)
*H02J 7/04* (2006.01)

(52) U.S. Cl.
CPC .......... *H02J 7/0052* (2013.01); *H02J 7/0004* (2013.01); *H02J 7/0027* (2013.01); *H02J 7/0088* (2013.01); *H02J 2007/0001* (2013.01); *H02J 2007/0062* (2013.01); *H02J 2007/0096* (2013.01)

(58) Field of Classification Search
CPC .............................. H02J 7/0073; H02J 7/0052
USPC ................................................. 320/106, 155
See application file for complete search history.

(56) References Cited

U.S. PATENT DOCUMENTS

| | | | |
|---|---|---|---|
| 6,104,163 A * | 8/2000 | Komatsu | H02J 7/0004 320/116 |
| 6,608,399 B2 * | 8/2003 | McConnell | B60R 11/02 307/10.1 |
| 6,798,173 B2 * | 9/2004 | Hsu | G06F 1/266 320/128 |
| 7,439,706 B2 * | 10/2008 | Brenner | H02J 7/0036 307/125 |
| 7,869,940 B2 * | 1/2011 | Dare | G06Q 30/0284 235/384 |
| 7,940,673 B2 * | 5/2011 | Ballard | B60R 16/03 370/241 |
| 8,594,854 B1 * | 11/2013 | Tareen | H04L 12/10 700/22 |

(Continued)

FOREIGN PATENT DOCUMENTS

CN 1845622 A 10/2006
CN 202217880 U 5/2012

(Continued)

OTHER PUBLICATIONS

Search Report, appended to an Office Action, issued in Taiwan counterpart application No. 103107015, Jul. 21, 2015, and corresponding English translation.

(Continued)

*Primary Examiner* — M'Baye Diao
(74) *Attorney, Agent, or Firm* — Hamre, Schumann, Mueller & Larson, P.C.

(57) ABSTRACT

A charging method includes a step of transmitting a start command to a charging device by an electronic device that pre-stores a charging authority therein when the electronic device determines the charging authority to be valid. The charging device is communicatively connected to the electronic device and includes an electrifying interface electrically connected to the electronic device. The start command causes the charging device to provide a power signal at the electrifying interface for charging the electronic device therethrough.

17 Claims, 6 Drawing Sheets

(56) References Cited

U.S. PATENT DOCUMENTS

| | | | | |
|---|---|---|---|---|
| 8,912,753 | B2* | 12/2014 | Pudar | B60L 11/1816 320/109 |
| 8,963,492 | B2* | 2/2015 | Rossi | B60L 11/1816 307/18 |
| 9,348,397 | B2* | 5/2016 | Su | G06F 1/3212 |
| 2002/0072816 | A1* | 6/2002 | Shdema | H04L 12/2805 700/94 |
| 2002/0194137 | A1* | 12/2002 | Park | G06Q 20/10 705/64 |
| 2008/0028237 | A1* | 1/2008 | Knight | H04L 12/66 713/300 |
| 2011/0279083 | A1* | 11/2011 | Asai | B60L 11/1816 320/109 |
| 2012/0122348 | A1* | 5/2012 | Cho | H01R 31/06 439/660 |
| 2012/0137159 | A1* | 5/2012 | Chin | G06F 1/26 713/340 |

FOREIGN PATENT DOCUMENTS

| | | |
|---|---|---|
| CN | 202230545 U | 5/2012 |
| CN | 103298644 | 9/2013 |
| CN | 103329173 A | 9/2013 |
| CN | 103546859 A | 1/2014 |
| CN | 103546994 | 1/2014 |
| CN | 103578169 A | 2/2014 |
| TW | 201238200 A | 9/2012 |
| TW | 201342772 A | 10/2013 |
| WO | 2013/058618 A2 | 4/2013 |
| WO | 2013/140536 A1 | 9/2013 |

OTHER PUBLICATIONS

Search Report appended to Office Action issued in Chinese counterpart application No. 201510092320.9, Nov. 30, 2016, and corresponding English translation.

* cited by examiner

CHARGING METHOD, CHARGING DEVICE, AND ELECTRONIC DEVICE FOR THE SAME

CROSS-REFERENCE TO RELATED APPLICATION

This application claims priority of Taiwanese Application No. 103107015, filed on Mar. 3, 2014.

FIELD

The disclosure relates to a charging technique, and more particularly to a charging method suitable for a public place.

BACKGROUND

Handheld electronic devices, such as smartphones and tablet computers, have become popular, thereby increasing demands of charging in public places. Some public places provide free charging services, but such free services are rare due to difficulty in implementing restricted free charging services through effective control of charging durations and restricting the services to authorized entities.

On the other hand, conventional paid charging services are not popular due to complex system architecture, which may lead to high costs in establishment. As an example, conventional charging devices, which process payments using credit cards, electronic tickets, NFC (near field communication) or QR codes, cannot independently operate and require support from an additional server when providing the charging services, thereby making the capability of communication with the server a must. Coin feed is another common payment type used in conventional charging devices. Problems with coin-feed charging devices usually reside in bulkiness and billing per use or per time-limited use.

SUMMARY

Therefore, an object of the disclosure is to provide a charging method that may be implemented by a charging device having a small size, simple architecture and low costs, and/or that may enable payment only for what a user uses.

According to one aspect of the disclosure, a charging method includes a step of transmitting a start command to a charging device by an electronic device that pre-stores a charging authority therein when the electronic device determines the charging authority to be valid. The charging device is communicatively connected to the electronic device and includes an electrifying interface electrically connected to the electronic device. The start command causes the charging device to provide a power signal at the electrifying interface for charging the electronic device therethrough.

According to another aspect of the disclosure, a charging device includes a communication interface, an electrifying unit, an electrifying interface and a processor.

The communication interface is configured to be communicatively connected to an electronic device.

The electrifying unit is configured to provide a power signal.

The electrifying interface is configured to electrically connect the electrifying unit and the electronic device.

The processor is electrically connected to the communication interface and the electrifying unit, and is configured to cause the electrifying unit to provide the power signal through the electrifying interface upon receipt of a start command through the communication interface, to thereby charge the electronic device, and to cause the electrifying unit to stop provision of the power signal at the electrifying interface upon receipt of a stop command through the communication interface.

According to yet another aspect of the disclosure, an electronic device includes a communication interface, a charging interface, a storage unit and a processor.

The communication interface is configured to be communicatively connected to a charging device.

The charging interface is configured to be electrically connected to the charging device for receiving a power signal therefrom so that the electronic device is charged via the charging interface.

The storage unit stores a charging authority therein.

The processor is electrically connected to the first communication interface, the charging interface and the storage unit, and is configured to control, via the communication interface, the charging device to provide or not to provide the power signal to the charging interface thereof according to the charging authority.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
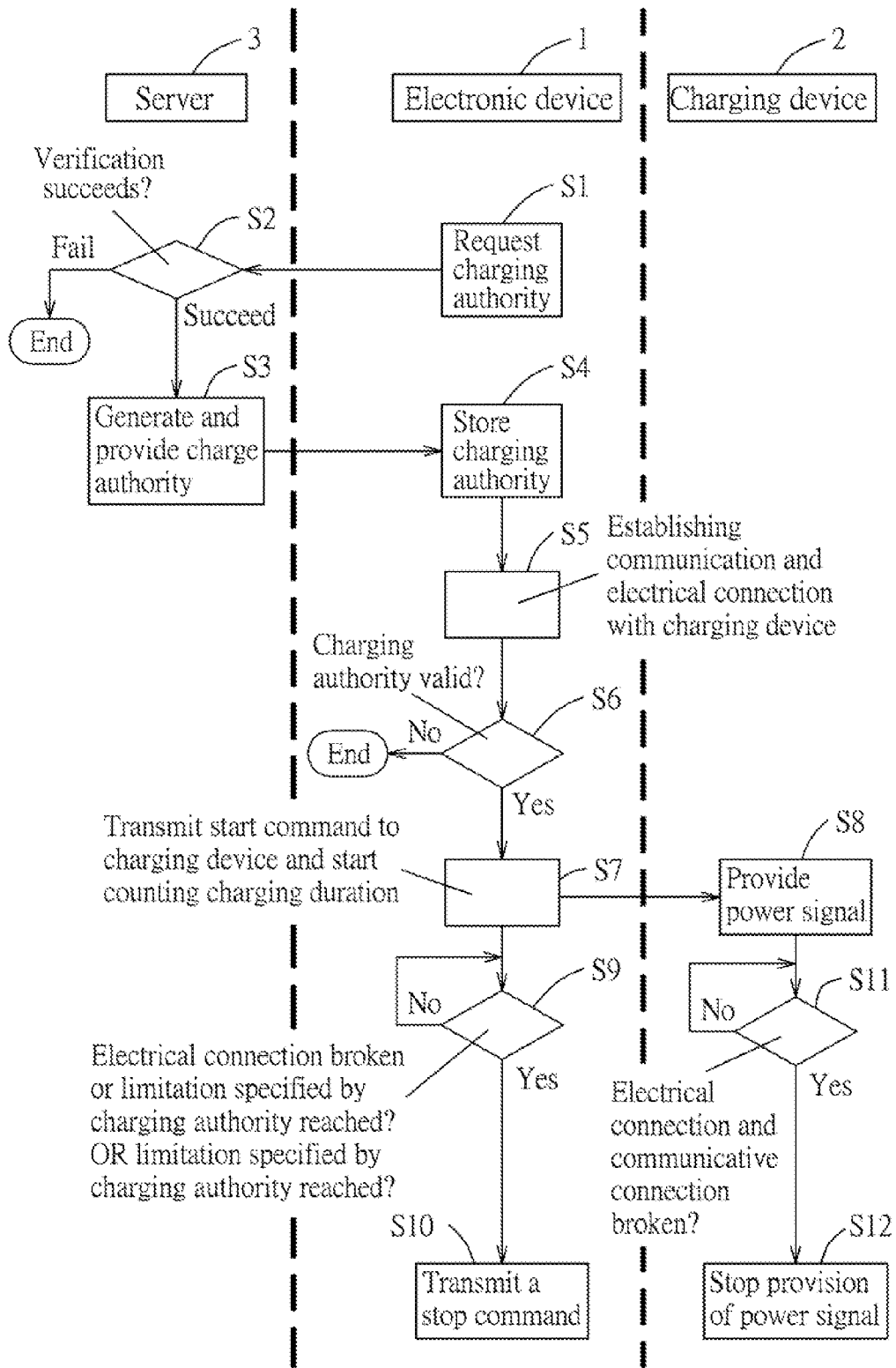
FIG. 1 is a flow chart illustrating steps of an embodiment of the charging method according to the disclosure.

Before the disclosure is described in greater detail, it should be noted that like elements are denoted by the same reference numerals throughout the disclosure.

Referring to FIG. 1, the embodiment of the charging method according to this disclosure is implemented using a to-be-charged electronic device 1 and a charging device 2. The electronic device 1 may be a portable electronic device, such as a mobile phone, a notebook computer, a tablet computer, etc.

The electronic device 1 has to acquire and store therein a charging authority in advance to be able to perform charging operation using the charging device 2. In step S1, the electronic device 1 may request the charging authority from a server 3 via purchase, registration or application. In practice, a user account may be applied or registered with the server 3 for the electronic device 1, and the applied/registered user account may be used to login to the server 3 using the electronic device 1. Then, the server 3 verifies the user account (step S2), and generates and provides the charging authority to the electronic device 1 upon successful verification of the user account (step S3). The charging authority may vary according to the user account or info crest ion provided during application/registration. As an example, free accounts, VIP accounts and/or paid accounts may have different charging authorities. In a case of the paid account, the charging authority may be purchased from the server 3 via online transaction, such as using online credit card payment, online transfer, web ATM, etc. In step S4, the electronic device 1 downloads from the server 3 and stores the charging authority therein. When the verification in step S2 fails, the server 3 does not generate the charging authority.

Note that the charging authority acquiring process is not limited to be completely performed by the electronic device 1. In one embodiment, another electronic device (e.g., a personal computer, a notebook computer, a mobile phone, a tablet computer, etc.) may be used to purchase, register or apply for the charging authority from the server 3, and the electronic device 1 only downloads the charging authority from the server 3. In one embodiment, another electronic device may be used to download from the server 3 and provide to the electronic device 1 the charging authority.

Figure 2:
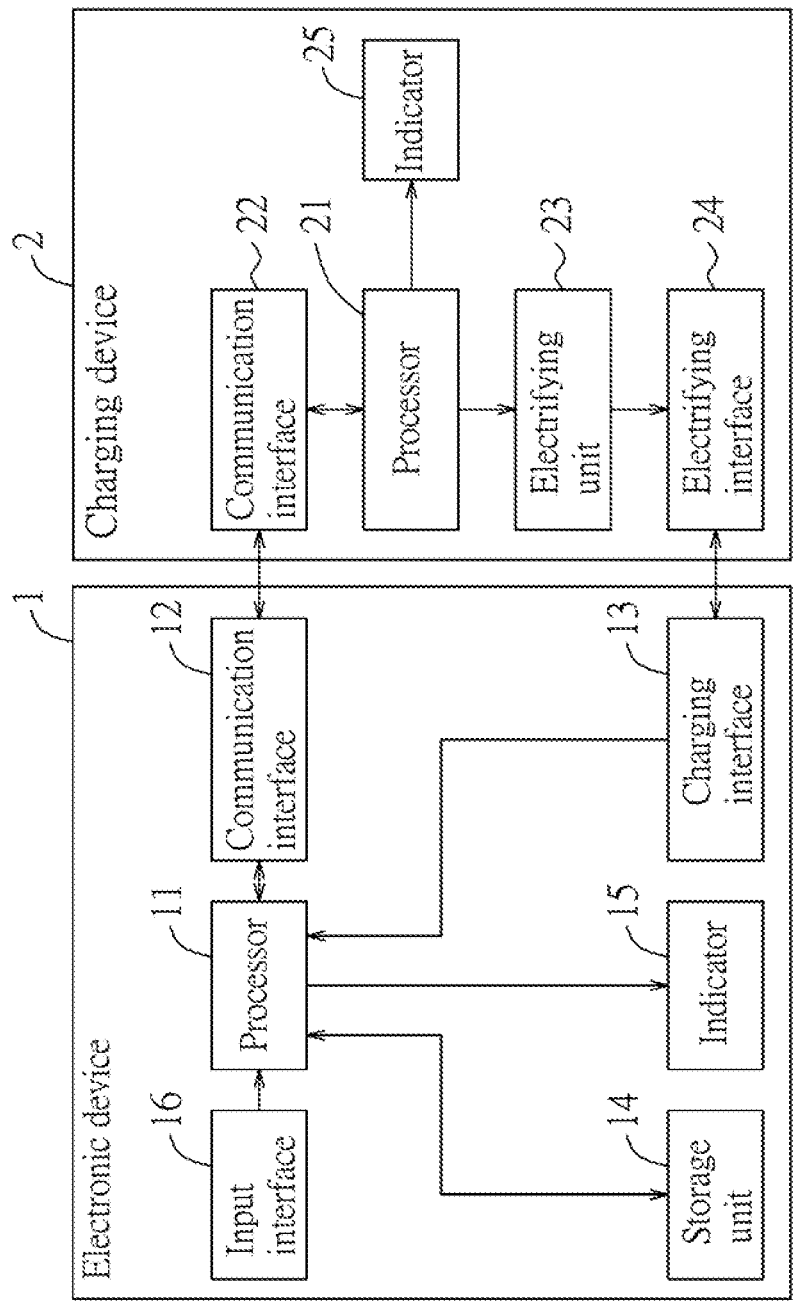
FIG. 2 is a block diagram illustrating a first embodiment of the electronic device and a charging device according to the disclosure.

Referring to FIG. 2, the electronic device 1 of this embodiment includes a communication interface 12, a charging interface 13, a storage unit 14 (e.g., a non-volatile memory, a hard disk drive, an optical disc, etc.), an indicator 15, an input interface 16, and a processor 11 electrically connected to the above components 12-16. The charging device 2 of this embodiment includes a processor 21, a communication interface 22 electrically connected to the processor 21, an electrifying unit 23 electrically connected to the processor 21 and configured to provide an electric power signal, an electrifying interface 24 electrically connected to the electrifying unit 23 and configured to output the power signal thereat, and an indicator 25 electrically connected to the processor 21. The communication, interfaces 12, 22 are configured to be capable of being communicatively connected to each other. The charging interface 13 and the electrifying interface 24 are configured to foe capable of being electrically connected to each other for transmission of the power signal.

When the electronic device 1 has stored the charging authority therein and requires charging, the communication interfaces 12, 22 nay be communicatively connected to each other, and the charging interface 13 of electronic device 1 may be electrically connected to the electrifying interface 24 of the charging device 2 (step S5). In this embodiment, communication, between the communication interfaces 12, 22 is established after completion of electrical connection between the charging interface 13 and the electrifying interface 24. In some embodiments, communication between the communication interfaces 12, 22 may be established using a wireless communication technique, for example, using WiFi to communicate through a local network, communicating through a Bluetooth network after Bluetooth matching, etc. In some embodiments, the communication interfaces 12, 22 may be wired connection interfaces, such as USB (universal serial bus) connectors. The processor 11 of the electronic device 1 may execute a first application to serve as a client terminal to create a communication channel with the processor 21 of the charging device 2 that executes a second application to serve as a host terminal for transmission of messages and/or commands.

After establishment of the communication channel is confirmed using the first and second applications, the processor 11 of the electronic device 1 determines whether or not the charging authority is valid (step S6), i.e., confirms whether or not the charging authority allows the electronic device 1 to be charged by the charging device 2. When the processor 11 confirms the charging authority to be valid, the processor 11 transmits a start command to the charging device 2, and starts timing a charging duration (step S7). In one embodiment, the start command may indicate a charging current magnitude.

Upon receipt of the start command, the processor 21 of the charging device 2 causes the electrifying unit 23 to provide the power signal with the charging current magnitude at the electrifying interface 24 (step S8), to thereby charge the electronic device 1 via the charging interface 13.

In step S9, during charging, the electronic device 1 continuously detects whether or not electrical connection between the charging interface 13 and the electrifying interface 24 of the electronic device 1 is broken, and whether or not the charging duration reaches a limitation specified by the charging authority (details thereof are described hereinafter). In one embodiment, when any one of the above determinations is affirmative, the processor 11 transmits a stop command to the charging device 2 via the communication interfaces 12, 22 (step S10), to thereby cause the processor 21 of the charging device 2 to control the electrifying unit 23 to stop provision of the power signal at the electrifying interface 24 (step S12). In one embodiment, step S10 may only include determining whether or not the charging duration reaches a limitation specified by the charging authority. Note that messages/commands transmitted to the charging device 2 (e.g., the start command, the stop command, etc.) may be encoded/encrypted by the first application executed by the processor 11, and the processor 21 of the charging device 2 may use the second application to decode/decrypt the messages/commands. If the processor 21 fails to correctly decode/decrypt the message/command, the charging device 2 does nothing.

In some embodiments, the method further includes step S11. In step S11, when charging the electronic device 1, the processor 21 of the charging device 2 continuously detects electrical connection and communicative connection with the electronic device 1. When the processor 21 of the charging device 2 determines that electrical connection between the electrifying interface 24 and the charging interface 13 is broken, and that communication between the communication interfaces 13, 24 is interrupted through the second application, the processor 21 causes the electrifying unit 23 to stop provision of the power signal at the electrifying interface 24 (step S12) even without receipt of the stop command.

Figure 3:
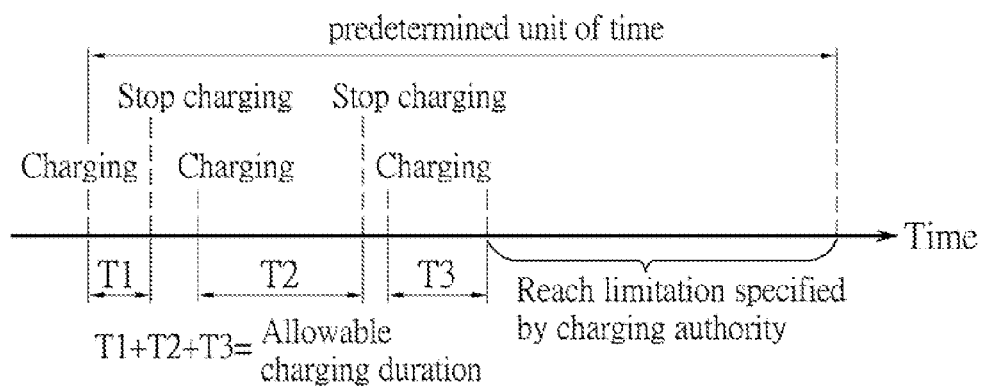
FIG. 3 is a timing diagram illustrating a charging operation in a time-counting payment implementation.

In one embodiment, the charging authority may be a monthly authority. As an example, the charging authority may indicate the charging current magnitude, and an allowable cumulative charging duration per predetermined unit of time (e.g., per day, per week, per month, etc.) within an authorized time period (e.g., one month or several months). In this case, the processor 11 may pause timing of the charging duration upon detecting that electrical connection between the charging interface 13 and the electrifying interface 24 is broken, and then resume timing of the charging duration upon detecting that electrical connection between the charging interface 13 and the electrifying interface 24 is established again in the same unit of time as said pausing (i.e., the charging duration timed in this case is a cumulative charging duration) should the counted charging duration be not greater than the allowable cumulative charging duration. We note that the "day" as used herein may be a calendar day or 24 hours from the receipt of the start command. Referring to FIG. 3, the processor 11 of the electronic device 1 determines in step S9 whether or not the cumulative charging duration (T1+T2+T3) reaches the allowable cumulative charging duration. An affirmative determination indicates that the cumulative charging duration has reached the limitation specified by the charging authority and the processor 11 stops timing the cumulative charging duration and transmits the stop command for controlling the charging device 2 to stop electrification (i.e., provision of the power signal) in step S10.

Figure 4:
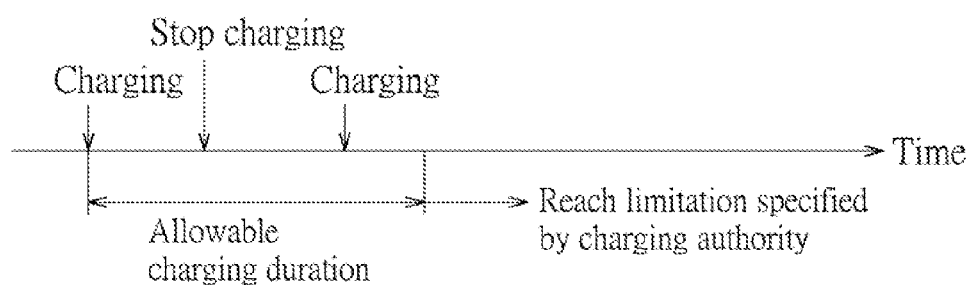
FIG. 4 is a timing diagram illustrating a charging operation in a pay-per-use implementation.

In one embodiment, the charging authority may be a pay-per-use authority. As an example, the charging authority may indicate the charging current magnitude, an allowable charging count (or an allowable number of uses) and an allowable charging duration for each count. When the electronic device 1 transmits the start command to the charging device 2 and receives the power signal from the charging device 2, the processor 11 may subtract the allowable charging count by one, and non-stoppingly time the charging duration until the charging duration reaches the allowable charging duration regardless of whether the electronic device 1 is actually being charged by the charging device 2 (e.g., regardless of whether the electrical connection between the electrifying interface 24 and the charging interface 13 becomes broken). Referring to FIG. 4, the processor 11 of the electronic device 1 determines in step S9 whether or not the charging duration timed thereby reaches the allowable charging duration. An affirmative determination indicates that the charging duration has reached the limitation specified by the charging authority, and the processor 11 transmits the stop command for controlling the charging device 2 to stop electrification in step S10.

In this embodiment, the indicator 15 of the electronic device 1 may be an LED (light emitting diode) device, and is electrically connected to the processor 11. During charging of the electronic device 1, the indicator 15 may provide light signals representing conditions of "under charging", "charging finished", "charging failed", etc. Likewise, the indicator 25 of the charging device 2 may be an LED device, and is electrically connected to the processor 21. When charging the electronic device 1, the indicator 25 may provide light signals representing "under charging", "charging finished", "charging failed", "malfunction", etc.

Figure 5:
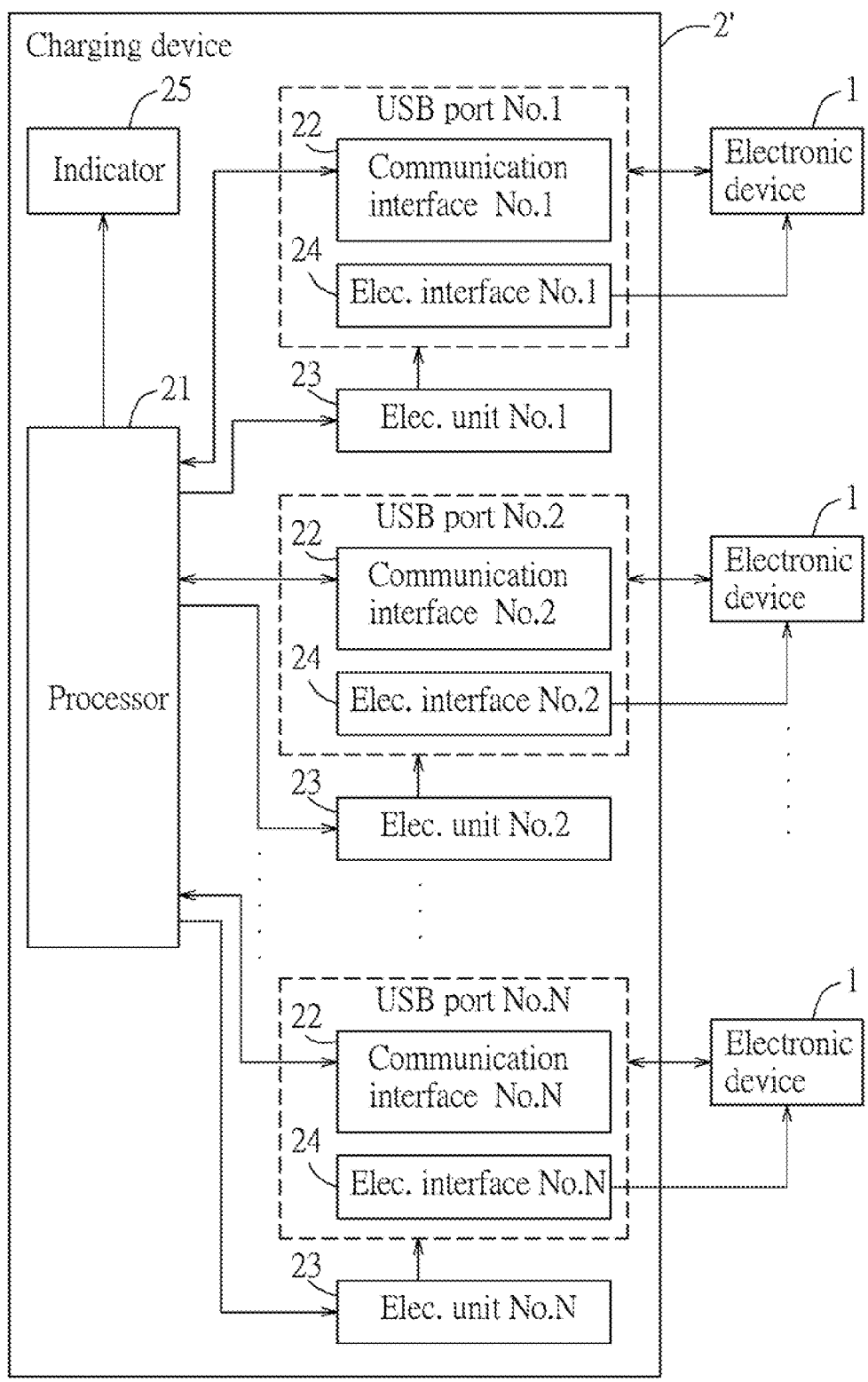
FIG. 5 is a block diagram illustrating a second embodiment of the charging device according to the disclosure.

Referring to FIG. 5, a second embodiment of the charging device 2' according to this disclosure is shown to include a plurality of the communication interfaces 22 (Comm. interfaces Nos. 1 to N) electrically connected to the processor 21, a plurality of the electrifying units 23 (Elec. units interfaces Nos. 1 to N) electrically connected to the processor 21, and a plurality of electrifying interfaces 24 (Elec. interfaces Nos. 1 to N) respectively and electrically connected to the electrifying units 23. The communication interfaces 22 may be wired data transmission interfaces, such as USB ports, Ethernet ports, MyDP (mobility DisplayPorts or SlimPorts), MHL (mobile high-definition link) ports, etc., or may be wireless data transmission interfaces, such as wireless communication units conforming to IEEE 802.11 specifications, Bluetooth units, NFC units, GPRS (general packet radio service) units, GSM (global system for mobile communications) units, CDMA (code division multiple access) units, WCDMA (wideband code division multiple access) units, PTE (long term evaluation) units, etc.

The electrifying interfaces 24 may be wired interfaces, such as USB ports, MyDP, MHL, AC power sockets, etc., or may be wireless interfaces, such as wireless power transmission units conforming to WPC (wireless power consortium) standard, PMA (power matters alliance) standard, A4WP (alliance for wireless power) standard, etc.

In this embodiment, one communication, interface 22 and one electrifying interface 24 are integrated using a USB port, and the processor 21 is electrically connected to (N) number of USB ports (USB port Nos. 1 to M). Further referring to FIG. 2, the electronic device 1 correspondingly includes (N) number of USB ports each integrating one communication interface 12 and one charging interface 13 therein for communicative and electrical connections with the charging device 2'.

When one of the USB ports of the charging device 2', as an example, USB port No. 1, is connected to the electronic device 1, a user may input an identity indication of the USB port No. 1 (i.e., the number "1") via the input interface 16 (e.g., a keyboard or a touch panel) of the electronic device 1. The processor 11 of the electronic device 1 then records the identity indication thus inputted in the storage unit 14, embeds/includes the inputted identity indication into the start command, and transmits to the charging device 2' the start command with the inputted identity indication via the communication interface 12. The processor 21 of the charging device 2' then controls, according to the identity indication included/embedded in the start command, the corresponding Elec. unit No. 1 to provide the power signal at the corresponding Elec. interface No. 1 of the USB port No. 1.

Figure 6:
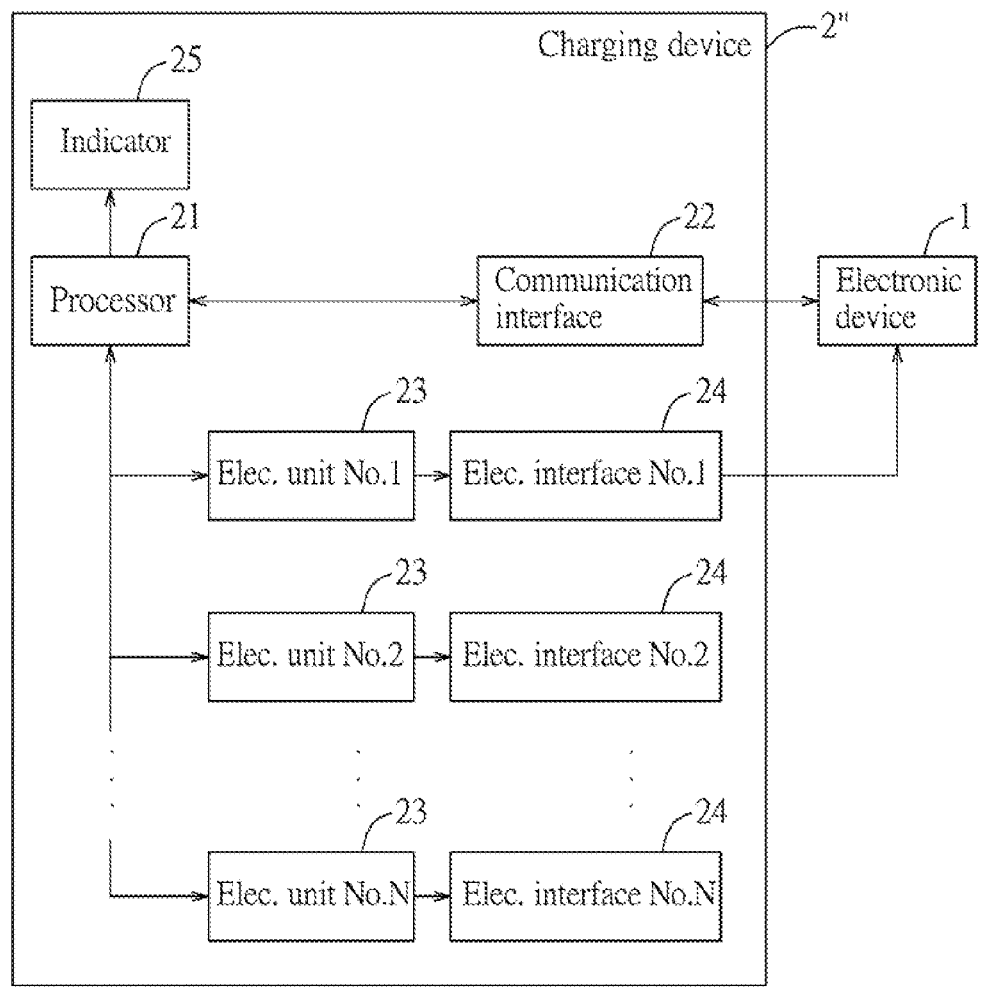
FIG. 6 is a block diagram illustrating a third embodiment of the charging device according to the disclosure.

Referring to FIG. 6, the third embodiment of the charging device 2" according to this disclosure is shown to differ from the second embodiment in that the charging device 2" includes one communication interface 22, a plurality of the electrifying units 23 (i.e., Elec. unit Nos. 1 to N) electrically connected to the processor 21, and a plurality of the electrifying interfaces 24 (i.e., Elec. interfaces Nos. 1 to N) respectively and electrically connected to the electrifying units 23.

When the electronic device 1 is electrically connected to one of the electrifying interfaces 24, the processor 21 may control a portion of those electrifying units 23 that do not currently provide the power signal to, for instance, another electronic device to provide the power signal at the corresponding electrifying interfaces 24 in a time-division manner (e.g., in an order from No. 1 to No. N) in order to determine which one of the electrifying interfaces 24 is connected electrically to the electronic device 1. When the processor 21 receives from the electronic device 1 a charging message indicating that charging is proceeding during provision of the power signal by a certain electrifying unit 23 (e.g., the Elec. unit No. 1), the processor 21 determines that the electronic device 1 is electrically connected to one of the electrifying interfaces 24 (the Elec. interface No. 1) corresponding to said certain electrifying unit 23 (the Elec. unit No. 1), controls said certain electrifying unit 23 (the electrifying unit No. 1) to continuously provide the power signal at the corresponding electrifying interface 24 (the Elec. interface No. 1), and reports to the electronic, device 1 an identity indication (e.g., the number or a code name) of the corresponding electrifying interface 24 (the Elec. interface No. 1), so that the electronic device 1 may record the identity indication.

Figure 7:
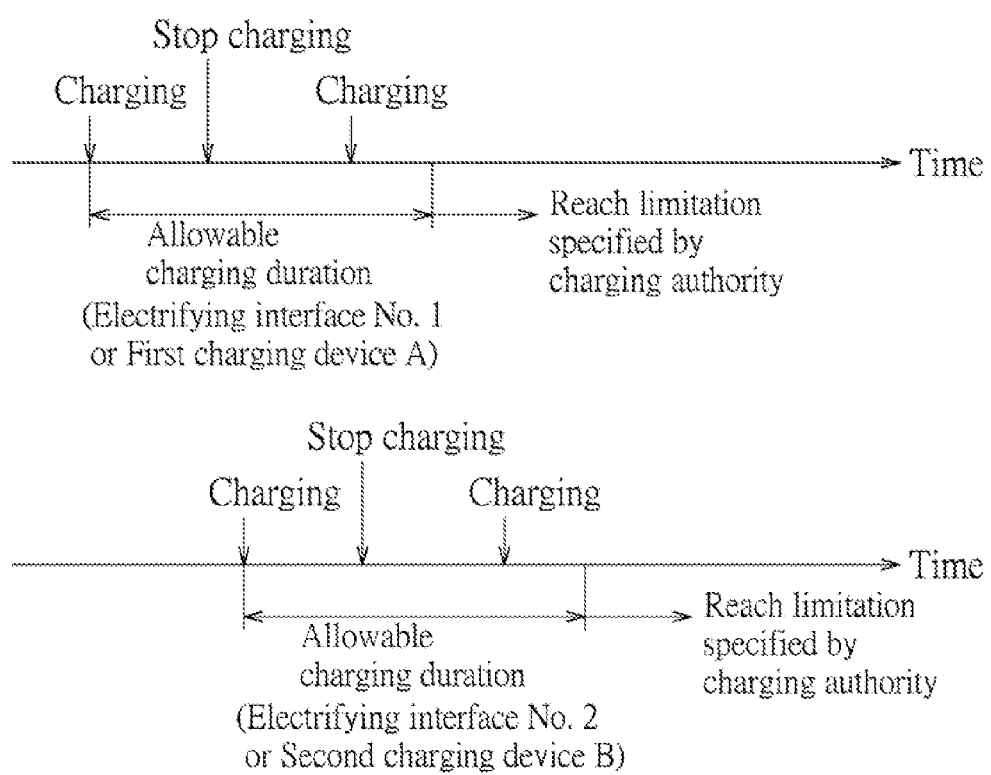
FIG. 7 is a timing diagram illustrating a charging operation using the second and third embodiments of the charging device in the pay-per-use implementation.

FIG. 7 is a timing diagram illustrating a charging operation of the second and third embodiments where the charging authority is the pay-per-use authority. In one implementation, when the electronic device 1 is first charged via the Elec. interface No. 1 of the charging device 2'/2", the processor 11 of the electronic device 1 may subtract the allowable charging count by one and start to time a first charging duration for to perform a first countdown from the allowable charging duration) for the Elec. interface No. 1, and may transmit the stop command to stop provision of the power signal at the Elec. interface No. 1 when the first charging duration reaches the allowable charging duration (or the first countdown reaches zero). In detail, when charging of the electronic device 1 via the Elec. interface No. 1 starts, the processor 11 of the electronic device 1 may non-stoppingly time the first charging duration even if the electronic device 1 then temporarily stops being charged via the electrifying interface No. 1.

During timing of the first charging duration, if the electronic device 1 is removed from the Elec. interface No. 1 and is transferred to be charged via the Elec. interface No. 2, the processor 11 of the electronic device 1 may further subtract the allowable charging count by one and start to time a second charging duration (or to perform a second countdown from the allowable charging duration) for the Elec. interface No. 2, and may transmit the stop command to stop provision of the power signal at the Elec. interface No. 2 when the second charging duration reaches the allowable charging duration (or the second countdown reaches zero). Similarly, when charging of the electronic device 1 via the Elec. interface No. 2 starts, the processor 11 of the electronic device 1 may non-stoppingly time the second charging duration even if the electronic device 1 then temporarily stops being charged via the Elec. interface No. 2. Accordingly, the allowable charging count is subtracted by one once the electronic device 1 starts being charged via any one of the electrifying interfaces 24.

In another implementation where the charging authority is the pay-per-use authority, each of the charging devices 2'/2" (e.g., first and second charging devices (A) and (B)) may have an identification code (or code name) for being identified by the electronic device 1. By virtue of the identification code, when charging of the electronic device 1 by the first charging device (A) starts, the processor 11 of the electronic device 1 may subtract the allowable charging count by one and start to time a first charging duration for the first charging device (A) until the first charging duration reaches the allowable charging duration. Before the first charging duration reaches the allowable charging duration, the processor 11 of the electronic device 1 may non-stoppingly time the first charging duration even if the electronic device 1 then temporarily stops being charged by the first charging device (A). When the electronic device 1 is transferred to be charged by the second charging device (B), the processor 11 of the electronic device 1 may further subtract the allowable charging count by one and start to time a second charging duration for the second charging device (B) until the second charging duration reaches the allowable charging duration.

Here is an example. The allowable charging duration is 30 minutes per use, the electronic device 1 is first charged using the first charging device (A) for 10 minutes, and is immediately changed to be charged using the second charging device (B) for 10 minutes. At this time, the processor 11 of the electronic device 1 may determine that the remaining allowable charging duration using the first charging device (A) is 10 minutes according to the identification code of the first charging device (A), and that the remaining allowable charging duration using the second charging device (B) is 20 minutes, according to the identification code of the second charging device (B). Therefore, if the electronic device 1 is then immediately connected to the first charging device (A) again, the electronic device 1 may still be charged by the first charging device (A) without the allowable charging count being again subtracted by one.

In summary, by virtue of the electronic device 1 acquiring the charging authority in advance, the electronic device 1 may control the charging device 2/2'/2" to charge or not to charge the electronic device 1 according to the charging authority, and none of the electronic device 1 and the charging device 2 requires communication capability (with a server) other than communication capability therebetween from the beginning to the end of the charging process. Accordingly, the charging device 2/2'/2" may independently operate in various embodiments with a small size, simple architecture, low costs and easy establishment, and/or the electronic device 1 may achieve payment only for what a user uses.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A charging method comprising:
    transmitting a start command to a charging device by an electronic device that pre-stores a charging authority therein when the electronic device determines the charging authority to be valid, the charging device being communicatively connected to the electronic device and including an electrifying interface electrically connected to the electronic device, the start command causing the charging device to provide a power signal at the electrifying interface for charging the electronic device therethrough.

2. The charging method according to claim 1, further comprising:
    starting to time a charging duration by the electronic device when the electronic device transmits the start command; and
    transmitting a stop command to the charging device by the electronic device when the electronic device determines that the charging duration reaches a limitation specified by the charging authority, the stop command causing the charging device to stop provision of the power signal at the electrifying interface.

3. The charging method according to claim 2, wherein the charging duration is a cumulative charging duration, and the charging authority indicates a charging current magnitude and an allowable cumulative charging duration per predetermined unit of time within an authorized time period, the charging method further comprising:
    determining by the electronic device that the cumulative charging duration reaches the limitation specified by the charging authority when the cumulative charging duration timed thereby in a time period of transmitting the start command that corresponds to the predetermined unit of time reaches the allowable cumulative charging duration, followed by stopping the timing of the cumulative charging duration and transmitting the stop command to the charging device.

4. The charging method according to claim 3, further comprising:
    pausing timing of the cumulative charging duration by the electronic device when electrical connection between the electronic device and the electrifying interface of the charging device is broken; and
    after the pausing timing of the cumulative charging duration by the electronic device, resuming timing of the cumulative charging duration by the electronic device when electrical connection between the electronic device and the electrifying interface of the charging device is established again in a same time period of the pausing timing of the cumulative charging duration by the electronic device that corresponds to the predetermined unit of time.

5. The charging method according to claim 2, wherein the charging authority indicates a charging current magnitude, an allowable charging count, and an allowable charging duration for each count, the charging method further comprising:
   subtracting, by the electronic device, the allowable charging count by one upon starting to time the charging duration, and non-stoppingly timing the charging duration for the electrifying interface; and
   determining by the electronic device that the charging duration reaches the limitation specified by the charging authority when the charging duration counted thereby reaches the allowable charging duration, followed by transmitting the stop command to the charging device.

6. The charging method according to claim 2, wherein the charging authority indicates a charging current magnitude, an allowable charging count, and an allowable charging duration for each count, the charging device having an identification code, the charging method further comprising:
   subtracting by the electronic device the allowable charging count by one and recording the identification code upon starting to time the charging duration, and non-stoppingly timing the charging duration for the identification code; and
   determining by the electronic device that the charging duration reaches the limitation specified by the charging authority when the charging duration timed thereby reaches the allowable charging duration, followed by transmitting the stop command to the charging device.

7. The charging method according to claim 1, further comprising:
   acquiring, by the electronic device, the charging authority before the transmitting the start command.

8. The charging method according to claim 7, wherein, the acquiring the charging authority includes acquiring the charging authority from a server via one of purchase, registration, and application.

9. The charging method according to claim 1, further comprising:
   stopping provision of the power signal at the electrifying interface by the charging device when the charging device determines at least one of a first condition, where communication between the electronic device and the charging device is interrupted, and a second condition, where electrical connection between the electronic device and the electrifying interface of the charging device is broken, is true.

10. A charging device, comprising:
    a communication interface configured to be communicatively connected to an electronic device;
    a plurality of electrifying units, each of the electrifying units being configured to provide a power signal;
    a plurality of electrifying interfaces, each of the electrifying interfaces being configured to electrically connect a respective one of the electrifying units and the electronic device, being electrically connected to the respective one of the electrifying units, and having an identity indication; and
    a processor electrically connected to the communication interface and each of the electrifying units, wherein the processor causes each of the electrifying units to provide the power signal through each of the electrifying interfaces upon receipt of a start command that is transmitted by the electronic device through the communication interface to thereby charge the electronic device;
    wherein the processor causes each of the electrifying units to stop provision of the power signal at a respective one of the electrifying interfaces upon receipt of a stop command through the communication interface; and
    wherein when one of the electrifying interfaces is electrically connected to the electronic device to serve as a connected electrifying interface, and the communication interface is communicatively connected to the electronic device and receives the start command that includes the identity indication of the connected electrifying interface, the processor causes, according to the identity indication included in the start command, one of the electrifying units corresponding to the connected electrifying interface to provide the power signal at the connected electrifying interface.

11. The charging device according to claim 10, wherein the processor, upon receipt of the start command that does not include the identity indication of any one of the electrifying interfaces via the communication interface, causes a portion of the electrifying units that do not currently provide the power signal at respective ones of the electrifying interfaces to provide the corresponding ones of the power signals respectively at the corresponding ones of the electrifying interfaces in a time-division manner; and
    upon receipt, from the electronic device via the communication interface, of a charging message indicating that charging is proceeding, during provision of the power signal by one of the portion of the electrifying units, causes the one of the portion of electrifying units to continuously provide the power signal at the respective one of the electrifying interfaces corresponding to the one of the portion of the electrifying units, and report to the electronic device the identity indication of the respective one of the electrifying interfaces via the communication interface.

12. An electronic device, comprising:
    a first communication interface configured to be communicatively connected to a charging device;
    a charging interface configured to be electrically connected to the charging device for receiving a power signal therefrom so that the electronic device is charged via the charging interface;
    a storage unit storing a charging authority therein; and
    a processor electrically connected to the first communication interface, the charging interface, and the storage unit, that controls, via the first communication interface, the charging device to provide or not to provide the power signal to the charging interface according to the charging authority.

13. The electronic device according to claim 12, the charging device including a second communication interface, and a plurality of electrifying interfaces each having an identity indication, the electronic device further comprising an input interface, wherein:
    when the first communication interface is communicatively connected to the second communication interface, and the charging interface is electrically connected to one of the electrifying interfaces that serves as a connected electrifying interface, the input interface is operable for input of the identity indication of the connected electrifying interface; and the processor, upon input of the identity indication of the connected electrifying interface, generates a start command including the identity indication of the connected electrifying interface, and causes the charging device to provide, according to the identity indication included in the start command, the power signal at the connected electrifying interface.

14. The electronic device according to claim 12, wherein:
the charging authority indicates a charging current magnitude and an allowable charging duration per predetermined unit of time within an authorized time period; and
the processor starts timing a charging duration from a beginning of receiving the power signal from the charging device, and stops timing the charging duration and transmits a stop command to the charging device via the first communication interface when the charging duration timed thereby in a time period of beginning to receive the power signal from the charging device that corresponds to the predetermined unit of time reaches the allowable charging duration, the stop command causing the charging device to stop provision of the power signal.

15. The electronic device according to claim 14, wherein the processor pauses timing of the charging duration when electrical connection between the charging interface and the charging device is broken, and resumes timing of the charging duration when electrical connection between the charging interface and the charging device is established again at a same time period of pausing the timing of the charging duration that corresponds to the predetermined unit of time.

16. The electronic device according to claim 12, the charging device having an electrifying interface at which the power signal is provided, wherein:

the charging authority indicates a charging current magnitude, an allowable charging count, and an allowable charging duration for each count; and
the processor non-stoppingly times a charging duration for the electrifying interface of the charging device from a beginning of receiving the power signal from the charging device, subtracts the allowable charging count by one upon starting to time the charging duration, and transmits a stop command to the charging device via the first communication interface when the charging duration timed thereby reaches the allowable charging duration, the stop command causing the charging device to stop provision of the power signal.

17. The electronic device according to claim 12, the charging device having an identification code, wherein:
the charging authority indicates a charging current magnitude, an allowable charging count, and an allowable charging duration for each count; and
the processor records the identification code, non-stoppingly times a charging duration for the identification code from a beginning of receiving the power signal from the charging device, subtracts the allowable charging count by one upon starting to time the charging duration, and transmits a stop command to the charging device having the identification code via the first communication interface when the charging duration timed thereby for the identification code reaches the allowable charging duration, the stop command causing the charging device to stop provision of the power signal.

* * * * *